United States Patent [19]

Iijima

[11] Patent Number: 5,339,400
[45] Date of Patent: Aug. 16, 1994

[54] PORTABLE ELECTRONIC DEVICE CAPABLE OF SELECTIVELY PROVIDING UNUSED AREA SIZE OF WHOLE MEMORY OR MEMORY SEGMENTS TO EXTERNAL DEVICE

[75] Inventor: Yasuo Iijima, Yokohama, Japan

[73] Assignee: Kabushiki Kaisha Toshiba, Kawasaki, Japan

[21] Appl. No.: 711,626

[22] Filed: Jun. 6, 1991

[30] Foreign Application Priority Data

Jun. 7, 1990 [JP] Japan ................... 2-147481

[51] Int. Cl.⁵ ............................................. G06F 12/00
[52] U.S. Cl. ......................... 395/425; 364/DIG. 1; 364/244; 364/243
[58] Field of Search ......................... 395/425; 364/200 MS File, 900 MS File

[56] References Cited

U.S. PATENT DOCUMENTS

| | | | |
|---|---|---|---|
| 4,748,320 | 5/1988 | Yorimoto et al. | 235/492 |
| 4,755,660 | 7/1988 | Nakano | 235/380 |
| 4,780,815 | 10/1988 | Shiota | 395/425 |
| 4,797,543 | 1/1989 | Watanabe | 235/492 |
| 4,831,245 | 5/1989 | Ogasawara | 235/492 |
| 4,833,595 | 5/1989 | Iijima | 395/375 |
| 4,891,506 | 1/1990 | Yoshimatsu | 235/492 |
| 4,908,789 | 3/1990 | Blokkum et al. | 395/425 |

FOREIGN PATENT DOCUMENTS

| | | |
|---|---|---|
| 2611289 | 8/1988 | France . |
| 2635886 | 2/1990 | France . |
| 2635890 | 2/1990 | France . |

Primary Examiner—Joseph L. Dixon
Assistant Examiner—Matthew M. Kim
Attorney, Agent, or Firm—Cushman, Darby & Cushman

[57] ABSTRACT

A portable electronic device which can be connected to an external device comprises a memory, having a storage area of a predetermined storage capacity, for storing information, a CPU for controlling read/write access of information for the memory, a program memory for storing program data for determining an operation of the CPU, and a connector for connecting the CPU to the external device. The CPU has a function of dividing the storage area of the memory into a plurality of first storage areas, a function of dividing a portion of the plurality of first storage areas into a plurality second storage areas, a function of detecting a storage size of each of the plurality of second storage areas, and a function of obtaining an unused storage capacity of the first storage area on the basis of the detected storage sizes of the plurality of second storage areas, and the storage capacity of the memory, and sending back the obtained result to the external device.

8 Claims, 12 Drawing Sheets

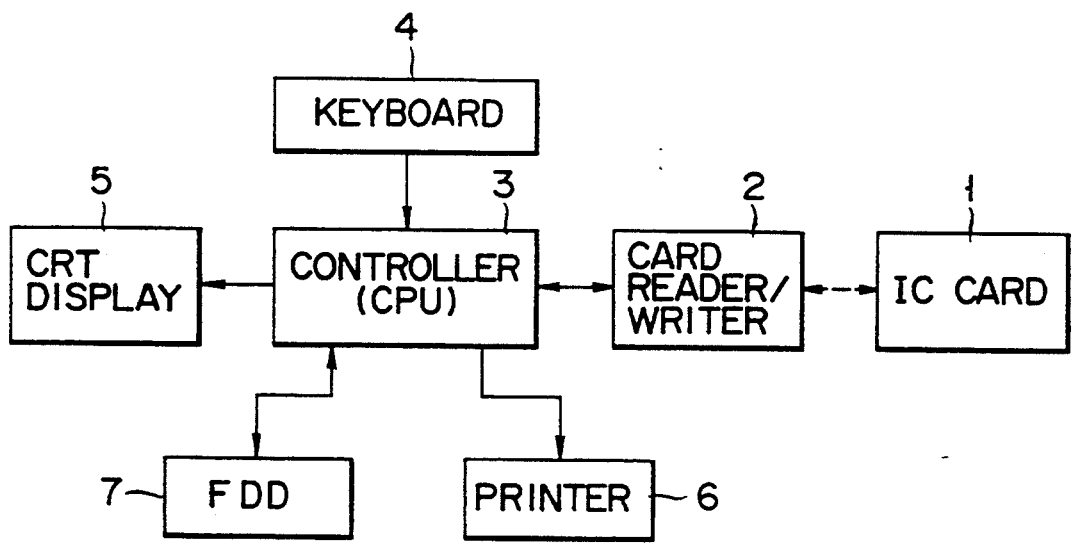
F I G. 1
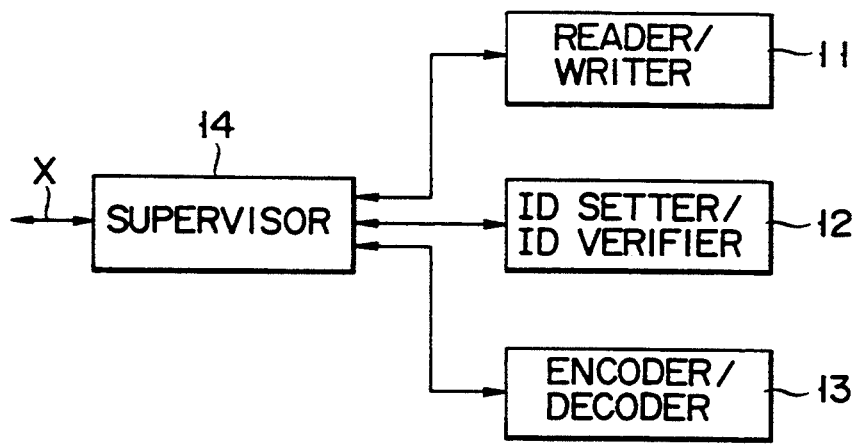
F I G. 2

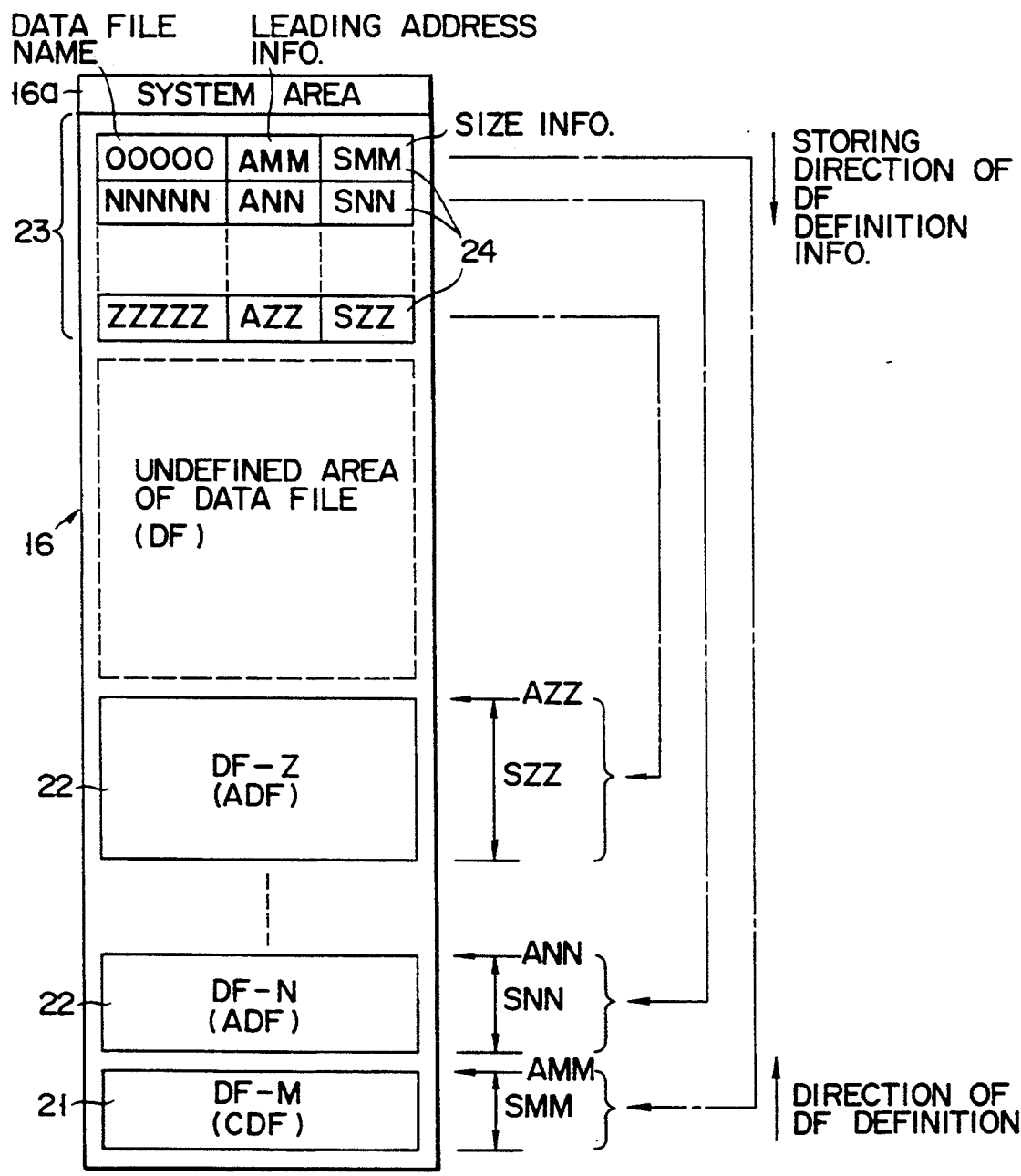
F I G. 4

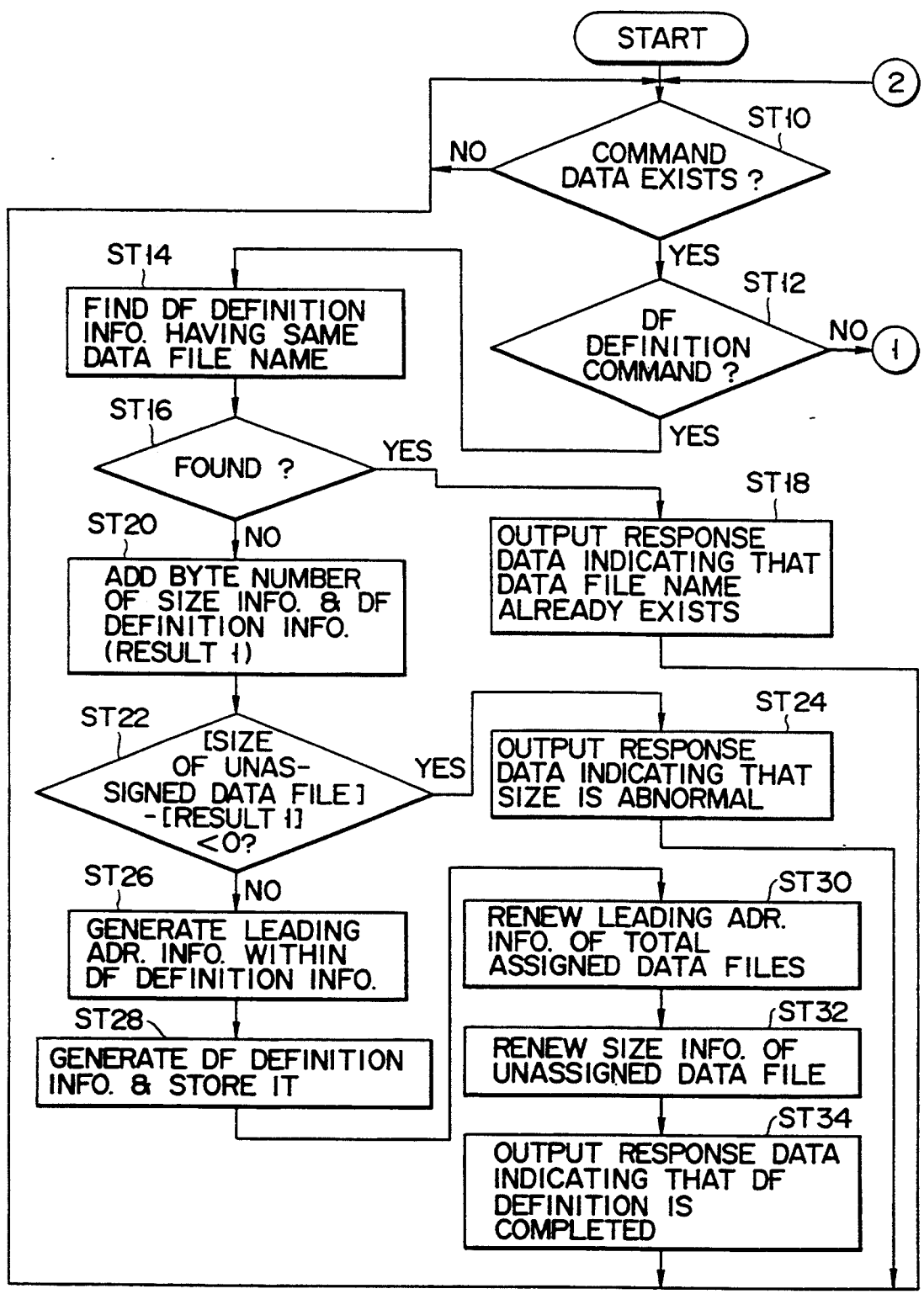
F I G. 16A

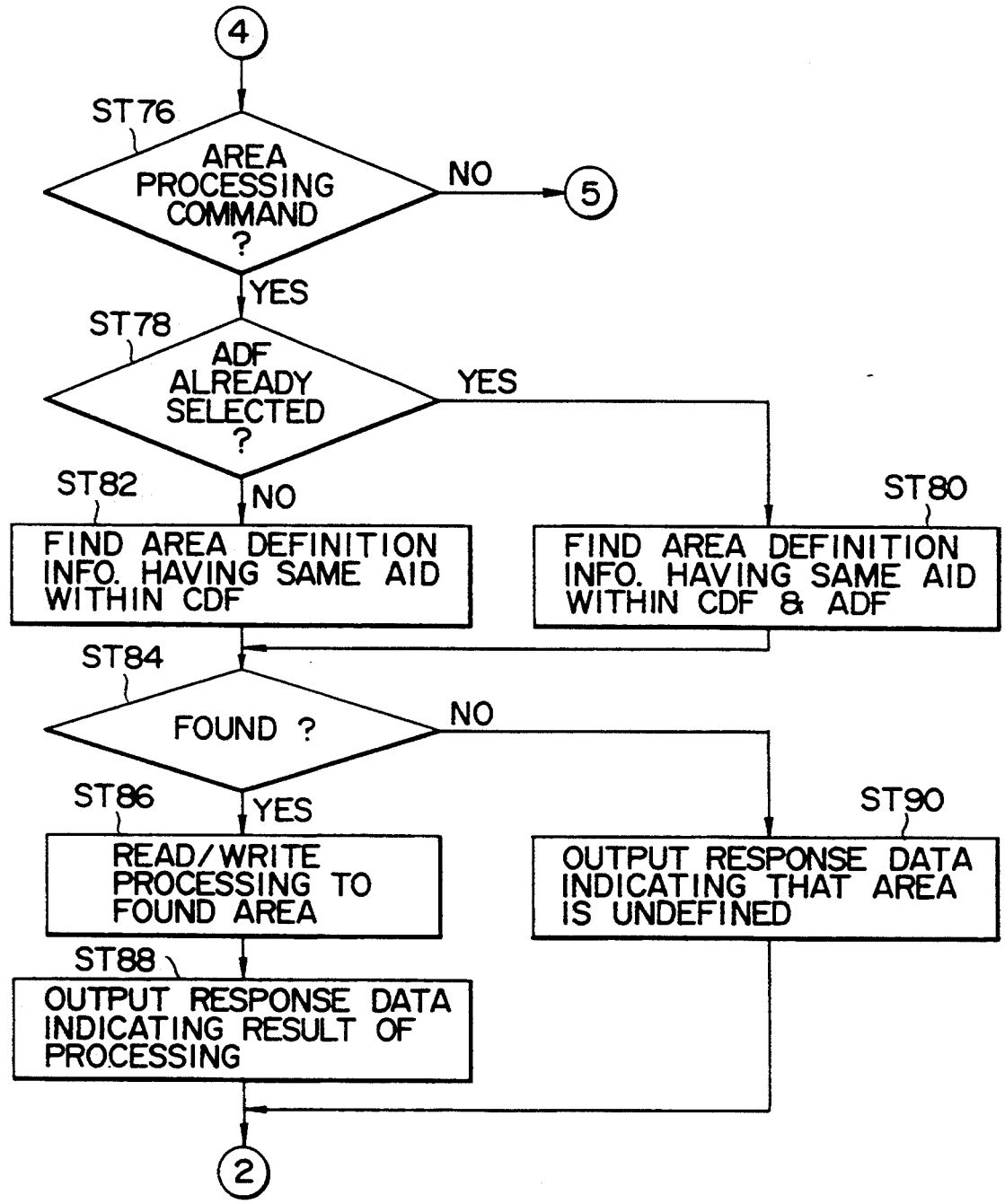
F I G. 16D

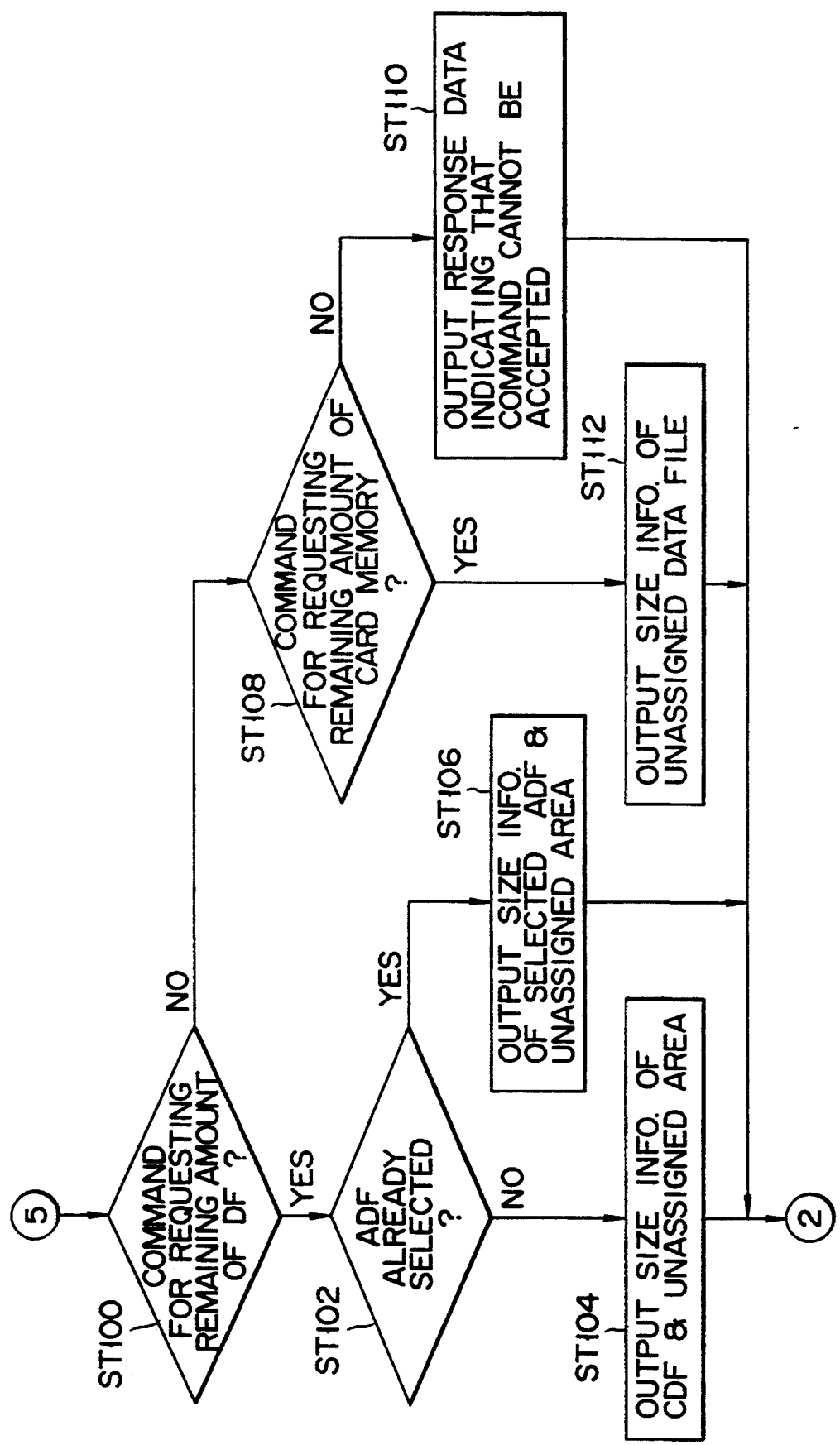
F I G. 16E

PORTABLE ELECTRONIC DEVICE CAPABLE OF SELECTIVELY PROVIDING UNUSED AREA SIZE OF WHOLE MEMORY OR MEMORY SEGMENTS TO EXTERNAL DEVICE

BACKGROUND OF THE INVENTION

1. Field of the Invention

The present invention relates to a portable electronic device called an IC (integrated circuit) card, which incorporates an IC chip having, among other elements, a nonvolatile memory, a control element such as a CPU (central processing unit) and, a management method for managing the memory. The management method of the present invention allows for the entire memory area to be utilized in an efficient manner.

2. Description of the Related Art

In recent years, IC cards which incorporate IC chips having erasable nonvolatile memory, and control elements such as a CPUs have received a great deal of attention as a new portable data storage medium. An IC card normally has an internal which is accessed by an internal control element for selectively inputting data and outputting data from an external device. Today's IC cards are utilized in the following manner. An IC card issuer assigns areas within the IC Card's memory to be given to service offerers. These areas have become known as "data files". Each service offerer can further divide the assigned area into a plurality of data areas which can be used for numerous functions, including system operation. In the past the card manufacturer had to inform the IC card issuer of the useable memory size in the IC card. There was not way of assuring that the usable memory size stated by the manufacturer was the actual amount available in the IC card because available memory could not be checked.

Similarly, when a card issuer assigns a data file, he cannot check whether or not a data file of a predetermined size is actually assigned in an IC card due to the inability to check available memory.

SUMMARY OF THE INVENTION

It is, therefore, an object of the present invention to provide a portable electronic device which allows easy external checking of a useable memory size in the device.

It is another object of the present invention to provide a portable electronic device which allows easy external checking of an assigned size of an area (data file) assigned by an issuer, and an unused area size.

The portable electronic device, has a memory unit, and a control unit for controlling the memory unit. The memory unit selectively performs data input and output operation with an external device. The memory unit is divided into a plurality of first storage areas. The first storage areas are further divided into a plurality of second storage areas. When the memory unit is divided into first storage areas, area sizes of the first storage areas can be obtained, and the remaining capacity of the memory unit can be obtained, based on the obtained area sizes. In accordance with an external request, the remaining capacity can be output to an external device.

The portable electronic device can also have the following features.

When the first storage area is divided into second storage areas, the remaining capacity of the second storage area, which are based on the area sizes can be obtained. In accordance with an external request, the obtained remaining capacity can be output to an external device.

Moreover, according to another aspect of the Invention, when the first and second storage areas are divided into a plurality of third storage areas, area sizes of the third storage area can be obtained. The portable electronic device can also allow for the selection of one of the plurality of second storage areas an external request, requires such a selection. The remaining capacity of a selected second storage area based on the obtained area can be output to an external device, and when a second storage area has not yet been selected, obtaining an the remaining capacity of the first storage area can be output to the external device.

In addition, the portable electronic device may allow for the designation of one of the plurality of first storage areas upon a request. The remaining capacity of the designated first storage areas based on the obtained area sizes can be output to an external device.

According to the present invention, since the data file unassigned size information (i.e. the empty capacity of the memory unit) of the memory unit can be output to an external device. A useable memory size in the device can be easily checked by the external device. When a data file (i.e. first storage area) is to be added, an unassigned size can be checked in advance to ensure there is sufficient space.

Furthermore, since the area of unassigned size information (i.e. remaining capacity) of a data file assigned to the memory unit can be output to an external device it can be easily checked by whether or not the area is used and thereby allowing for precise area assignment in the data file.

Additional objects and advantages of the invention will be set forth in the description which follows. Other embodiments will be obvious from the description, or may be learned by practice of the invention. The objects and advantages of the invention can be obtained by an examination of the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an arrangement of a terminal device;

FIG. 2 is a block diagram showing function blocks of an IC card;

FIG. 4 shows a data file architecture in a data memory;

FIGS. 16A to 16E are flow charts for explaining processing operations.

DETAILED DESCRIPTION OF THE PREFERRED EMBODIMENTS

Figures 3, 5:
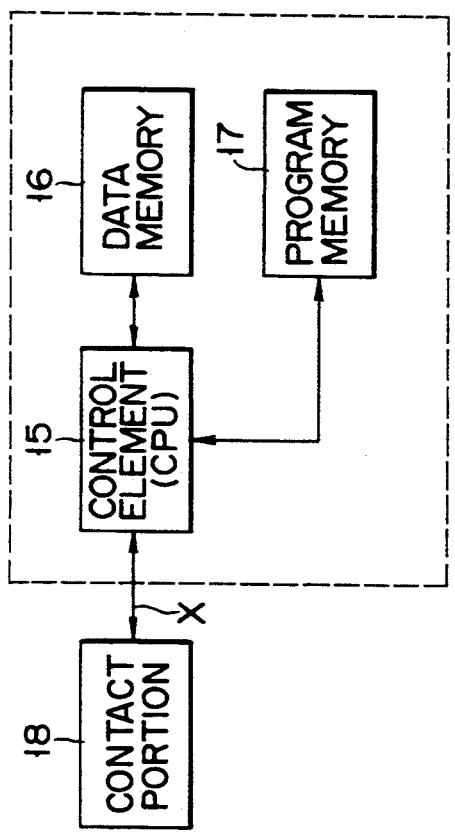
FIG. 3 is a block diagram showing an arrangement of the IC card.
FIG. 5 is a view for explaining data file definition information.

An embodiment of the present invention will be described hereinafter with reference to the accompanying drawings.

FIG. 1 shows an arrangement of a terminal device for processing an IC card as a portable electronic device according to the present invention. More specifically, the terminal device allows IC card 1 to be connected to control unit 3 comprising a CPU via card reader/writer 2, and is constituted by connecting keyboard 4, CRT (cathode ray tube) display 5, printer 6, and floppy disk drive (FDD) 7 to control unit 3.

IC card 1 is used for referring to an identification (ID) number known by only a user, and for storing necessary data during, e.g., a purchase of a merchandise item. As shown in, e.g., FIG. 2 showing function blocks, IC card 1 comprises sections for executing basic functions (i.e., reader/writer 11, ID setter/ID verifier and encoder/decoder 13), and supervisor 14 for managing these basic functions.

Reader/writer 11 has a function of performing a data read/write/erase operation for data memory 16, or the like.

ID setter/ID verifier 12 has a function of performing storage and read inhibition processing of an ID number set by a user, and a function of verifying the ID number after the number is set so as to permit the subsequent processing.

Encoder/decoder 13 has a function of encoding communication data to prevent the communication data from leaking or being counterfeited when data is from control unit 3 to another terminal device via a communication line, and a function of decoding encoded data, i.e., has a function of executing data processing in accordance with an encryption algorithm having a sufficient encryption power such as a DES (Data Encryption Standard).

Supervisor 14 has a function of decoding a function code input from card reader/writer 2, or a function code added with data, selecting a necessary one of the basic functions, and executing the selected function.

In order to use these functions, IC card 1 is constituted by control element (control unit) 15 such as a CPU, data memory (memory unit) 16, program memory 17, and contact portion 18 for obtaining an electrical contact with card reader/writer 2, as shown in FIG. 3. Of these components, control element 15, data memory 16, and program memory 17 are constituted by a single IC chip (or a plurality of IC chips), and are embedded in an IC card main body.

Program memory 17 comprises, e.g., a mask ROM (read only memory), and stores a control program for control element 15, which program has subroutines for realizing the basic functions.

Data memory 16 is used for storing various data, and comprises an erasable nonvolatile memory such as an EEPROM.

Data memory 16 is roughly divided and defined as system area 16a for storing an unassigned data file size and an assigned total data file leading address (cf. FIG. 9), one common data file (CDF) 21 used commonly in all applications, and a plurality of application data files (ADFs) 22 used in units of applications, as shown in FIG. 4. These data files (DFs) 21 and 22 are defined by DF definition information 24 in data file definition table 23. In this case, DF definition information 24 is stored from one end (e.g., a leading address) of data memory 16, and DFs 21 and 22 defined by DF definition information 24 are defined from the other end (e.g., an end address) of data memory 16.

DF definition information 24 is a data string indicating a correspondence among a DF name (DFN) as identification information for designating an area, leading address information, size information, and access condition information on the memory where a DF is assigned, assigned total area leading address information, and unassigned area size information, as shown in, e.g., FIG. 5.

In a state wherein no area is defined in a defined DF, the value of the unassigned area size information indicates the maximum size of the corresponding DF, and the assigned total area leading address information has a value obtained by adding "1" to the end address of the corresponding DF.

DF definition information 24 is sequentially stored in response to DF definition command data (to be described later). In FIG. 4, a plurality of pieces of information 24 are stored in the order of DFNs "00000", "NNNNN", ... "ZZZZZ" in response to the command data In particular, the DFN "00000" is reserved in the memory as the DFN of CDF 21.

Figure 6:
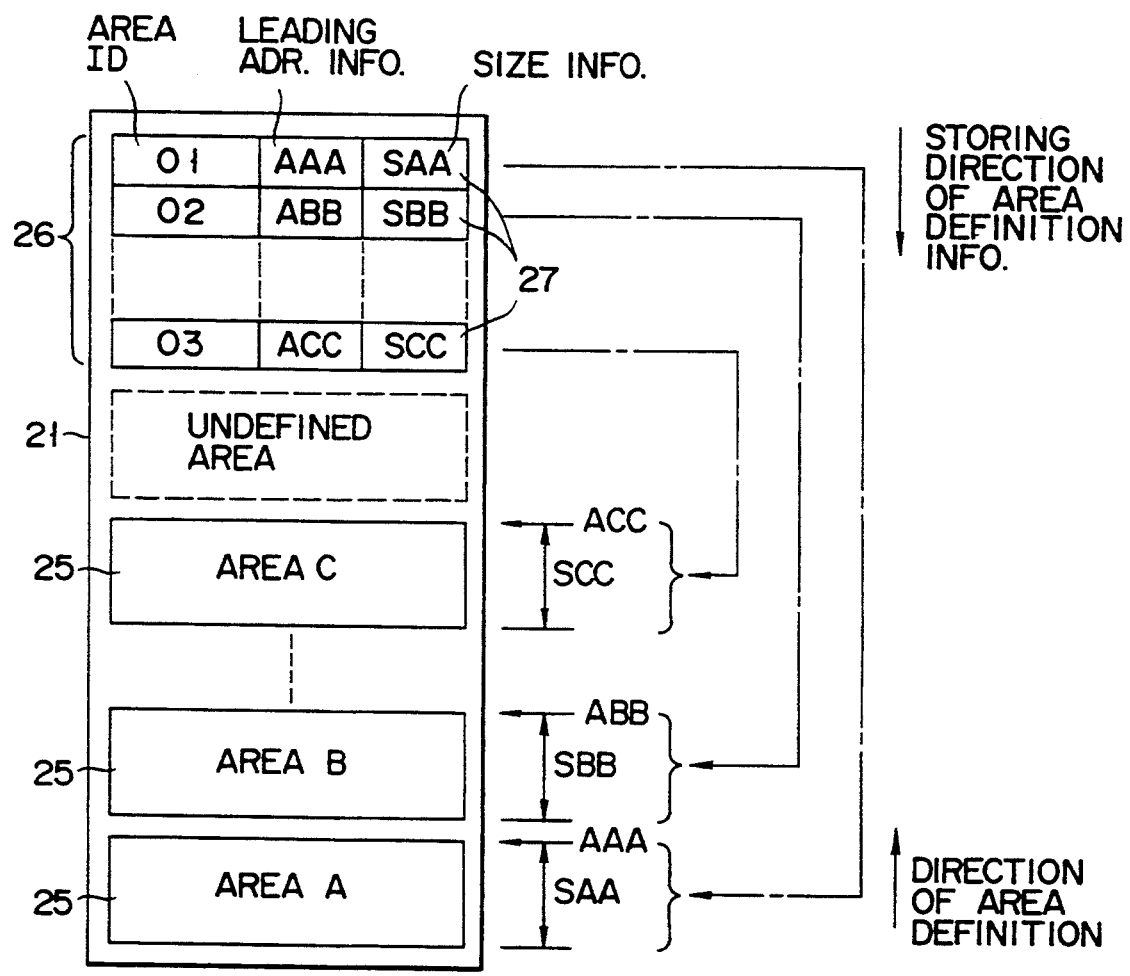
FIG. 6 shows an area architecture in a common data file.
Figure 7:
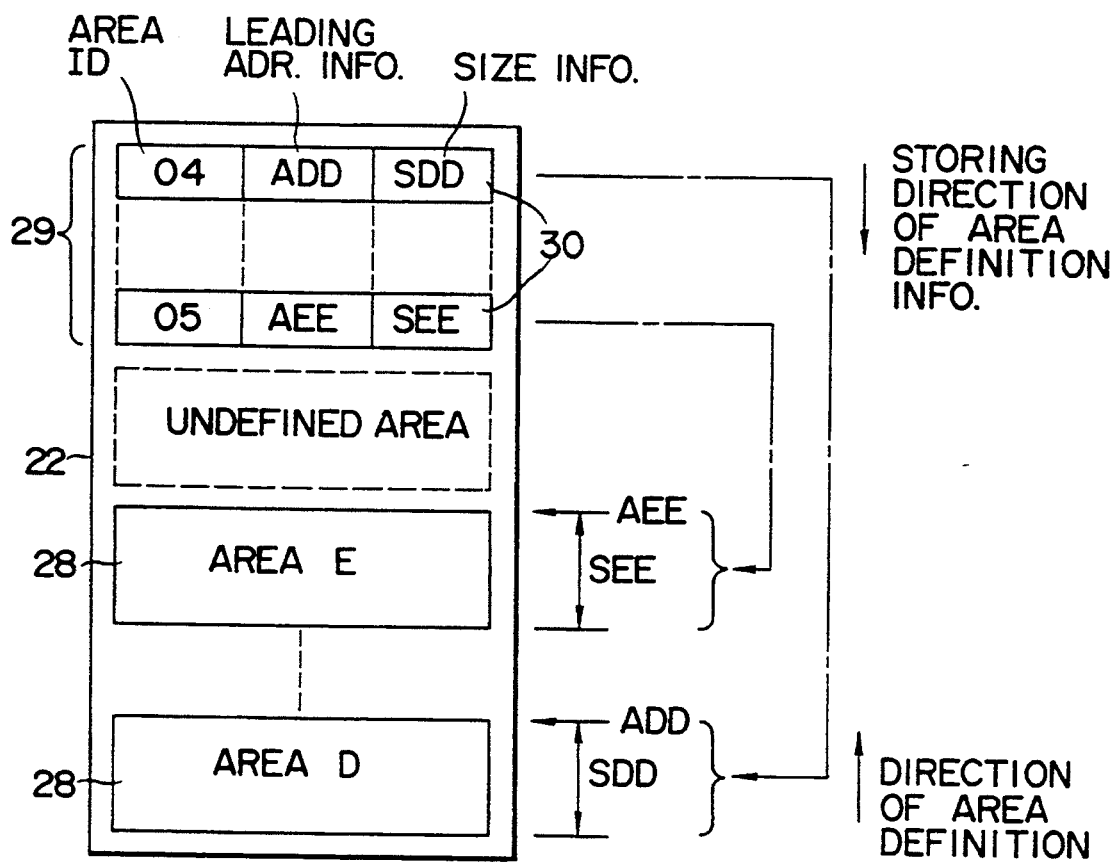
FIG. 7 shows an area architecture in an application data file.

CDF 21 is divisionally defined as a plurality of areas 25, as shown in FIG. 6, and each ADF 22 is divisionally defined as a plurality of areas 28, as shown in FIG. 7. These areas 25 and 28 are respectively defined by area definition information 27 and area definition information 30 of area definition tables 26 and 29. In this case, area definition information 27 and area definition information 30 are stored from one end portions (e.g., leading addresses) of DFs 21 and 22, and areas 25 and 28 respectively defined by area definition information 27 and area definition information 30 are defined from the other end portions (e.g., end addresses) of DFs 21 and 22.

Figure 8:
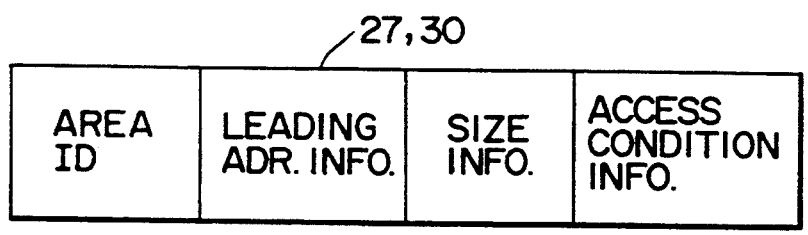
FIG. 8 is a view for explaining area definition information.

Each of area definition information 27 and area definition information 30 is a data string indicating a correspondence among an area identification number (AID) as identification information for designating an area, leading address information on the memory where the area is assigned, size information, and access condition information, as shown in FIG. 8.

Figure 9:
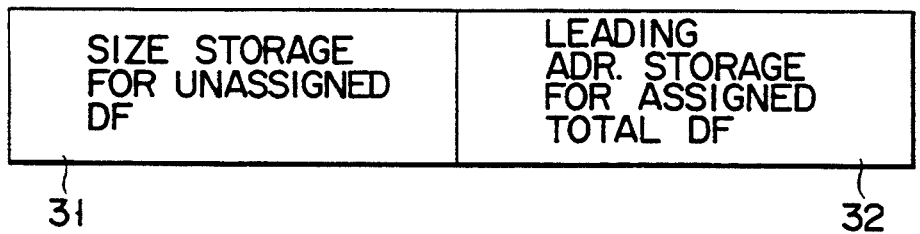
FIG. 9 is a view for explaining a size storage for an unassigned data file, and a leading address size storage for assigned total data files.

Area definition information 27 and area definition information 30 are sequentially stored in response to area definition command data (to be described later). In FIG. 6, a plurality of pieces of information are stored in the order of AIDs "01", "02", ... "03" in response to the command data. In FIG. 7, a plurality of pieces of information are stored in the order of AIDs "04", ..., "05" in response to the command data FIG. 9 shows size storage 31 for an unassigned DF, for storing size information of an unassigned DF, and leading address storage 32 for assigned total DFs, for storing leading address information of assigned total DFs. These storages are allocated in, e.g., data memory 16.

In a state wherein no DF is assigned, the value of size information of an unassigned DF represents the maximum size for DF assignment allocated in data memory 16, and the leading address information of assigned total DFs has a value obtained by adding "1" to the end address of an area in data memory 16.

The operation of the above arrangement will be described below with reference to the flow charts shown in FIGS. 16A to 16E.

Figure 10:
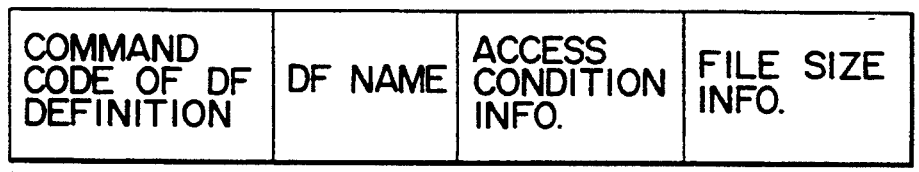
FIG. 10 shows a format of data file definition command data.

DF definition processing will be explained below with reference to FIG. 16A. In a steady state, external command data is waited. When command data is input in this state (YES in ST10), control element 15 checks if the input command data is DF definition command data shown in FIG. 10 (ST12). If it is determined that the input command data is not DF definition command data (NO in ST12), control element 15 starts processing for determining another command data.

If it is determined that the input command data is the DF definition command data (YES in ST12), control element 15 finds DF definition information having the same DFN as that in the input command data from data memory 16 (ST14). If the DF definition information is found (YES in ST16), control element 15 outputs response data indicating that the input DFN already exists (ST18), and then waits for command data.

If the DF definition information is not found (NO in ST16), control element 15 adds a byte number (size information) of the DF definition data to file size information in the command data to obtain the sum as result 1 (ST20), and compares the result 1 with a value in size storage 31. As a result of comparison, if it is determined that the value in size storage 31 is smaller than result 1 (YES in ST22), control element 15 determines that a DF to be defined by the input command data cannot be assigned in data memory 16, outputs response data indicating that the size is abnormal (ST24), and is set in a command data waiting state.

As a result of comparison, if it is determined that result 1 is equal to or smaller than the value in storage 31 (NO in ST22), control element 15 determines that a DF defined by the input command data can be assigned in data memory 16, and generates leading address information in DF definition information (ST26). The leading address information can be generated by internally calculating a sum of the value in leading address storage 32 and an address value corresponding to file size information in the input command data.

When the leading address information is generated in this manner, control element 15 generates DF definition information as a set of a DFN, access condition information, and file size information in the input command data, and the generated leading address information (ST28). If another DF definition information has already been stored, the generated DF definition information is stored at the next address. In this case, in a state wherein no DF is stored, DF definition information is stored from the leading address of data memory 16.

After the DF definition information is stored, control element 15 renews the value in leading address storage 32 with the presently stored leading address information (ST30). In addition, control element 15 subtracts the presently stored size information, and the byte number of the DF definition information from the value in size storage 31, and stores the difference in size storage 31 as new size information of an unassigned DF (ST32). Control element 15 outputs response data indicating that DF definition is completed (ST34), and is then set in a command data waiting state.

With this processing, a plurality of pieces of DF definition information 24 are sequentially stored in an area for DF assignment allocated in data memory 16 from smaller addresses, and DFs 21 and 22 defined by DF definition information 24 are sequentially stored from larger addresses, as shown in FIG. 4.

Figure 11:
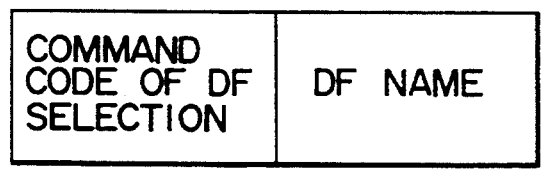
FIG. 11 shows a format of data file selection data.
Figure 16B:
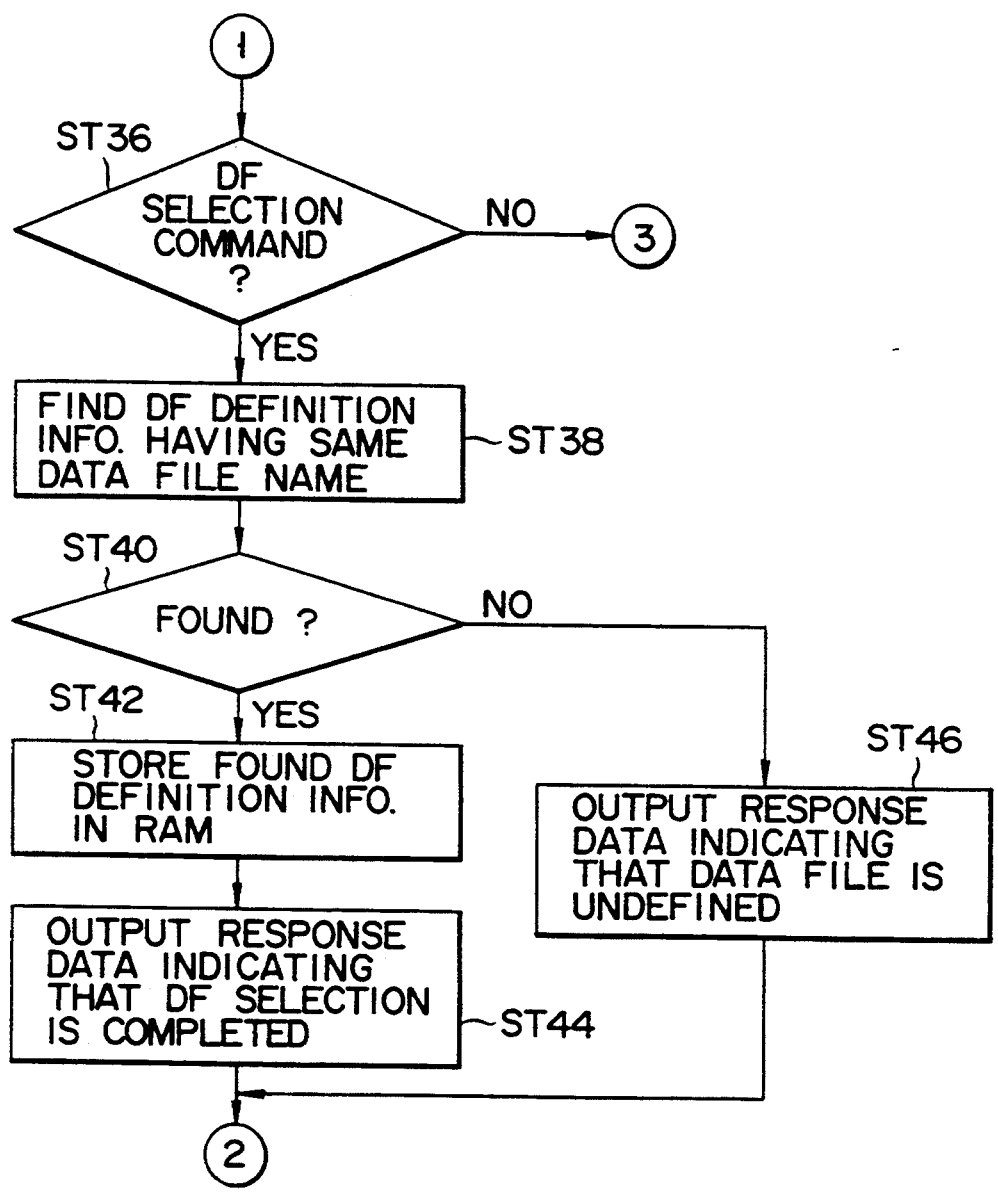

DF selection processing will be explained below with reference to FIG. 16B. As a result of checking whether or not the input command data is the DF definition command data, if it is determined that the input data is not the DF definition command data (NO in ST12 in FIG. 16A), control element 15 checks if the input command data is DF selection command data shown in FIG. 11 (ST36). If it is determined that the input command data is not DF selection command data (NO in ST36), control elements 15 starts processing for determining another command data.

If it is determined that the input command data is DF selection command data (YES in ST36), control element 15 finds DF definition information having the same DFN as that in the input command data from data memory 16 (ST38). If the corresponding information cannot be found (NO in ST40), control element 15 outputs response data indicating that a DF is undefined (ST46), and is then set in a command data waiting state.

If the corresponding information is found (YES in ST40), control element 15 stores the DF definition information in its internal RAM (ST42), and outputs response data indicating that DF selection is completed (ST44). Control element 15 is then set in a command data waiting state.

Figure 12:
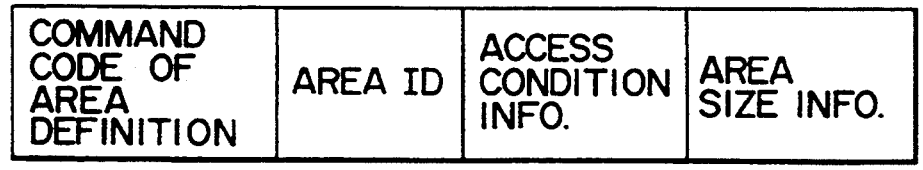
FIG. 12 shows a format of area definition command data.
Figure 16C:
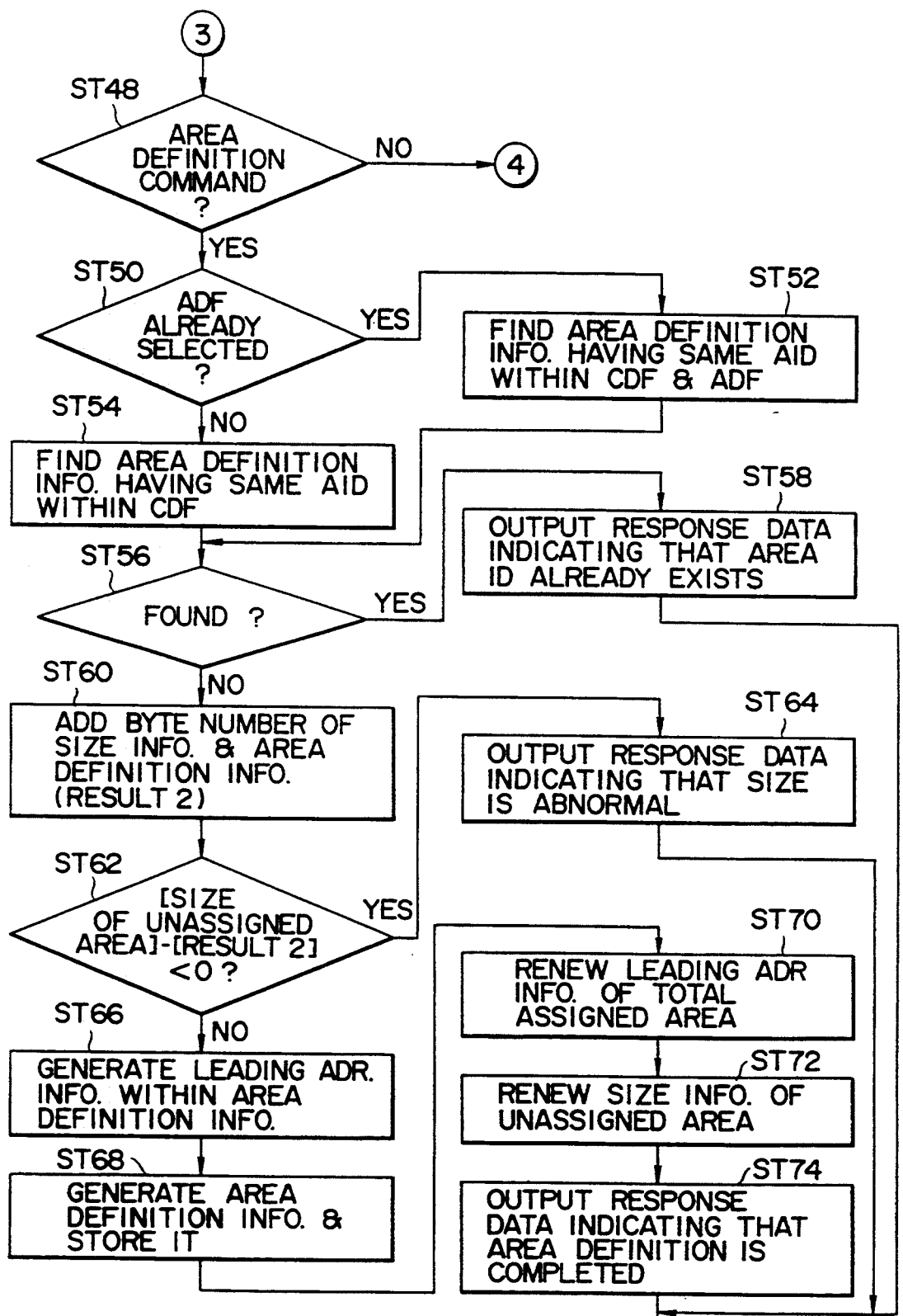

Area definition processing will be described below with reference to FIG. 16C. As a result of checking whether or not the input data is DF selection command data, if it is determined that the input data is not DF selection command data (NO in ST36 in FIG. 16B), control element 15 checks if the input data is area definition command data shown in FIG. 12 (ST48). If it is determined that the input data is not area definition command data (NO in ST48), control element 15 starts processing for determining another command data.

If it is determined that the input command data is area definition command data (YES in ST48), control element 15 looks up DF definition information stored in the RAM upon the DF selection to check if ADF 22 is selected (ST50).

If it is determined that ADF 22 is not selected (NO in ST50), control element 15 looks up the content of CDF 21 to find area definition information having the same area identification number (AID) as that in the input command data (ST54). If it is determined that ADF 22 is selected (YES in ST50), control element 15 looks up the content of CDF 21 and selected ADF 22 to similarly find area definition information (ST52). If the area definition information is found (YES in ST56), control element 15 outputs response data indicating that the AID already exists (ST58), and is then set in a command data waiting state.

If no information is found (NO in ST56), control element 15 adds the byte number (size information) of the area definition information to area size information in the input command data to obtain the sum as result 2 (ST60), and compares result 2 with size information of an unassigned area in the DF definition information.

In this case, if ADF 22 is not selected (NO in ST50), size information of an unassigned area in DF definition information defining CDF 21 is used in comparison. If ADF 22 is selected (YES in ST50), size information of an unassigned area in DF definition information defining selected ADF 22 is used in comparison.

As a result of comparison, if an unassigned area size is smaller than result 2 (YES in ST62), control element 15 determines that an area defined by the input command data is not assigned in this DF, outputs response data indicating that the size is abnormal (ST64), and is set in a command data waiting state.

As a result of comparison, if result 2 is equal to or larger than an unassigned area size (NO in ST62), control element 15 determines that an area defined by the input command data can be assigned in the DF, and generates leading address information in area definition information (ST66). The leading address information can be generated by internally calculating a sum of leading address information of assigned total areas, and an address value corresponding to area size information in the input command data.

In this case, if ADF 22 is not selected (NO in ST50), leading address information of assigned total areas in DF definition information defining CDF 21 is added. If ADF 22 is selected (YES in ST50), leading address information of assigned total areas in DF definition information defining selected ADF 22 is added.

After the leading address information is generated in this manner, control element 15 generates area definition information as a set of an AID, access condition information, and area size information in the input command data, and the generated leading address information (ST68). If another area definition information has already been stored, new information is stored at the next address. In this case, in a state wherein no area is defined, area definition information is stored from the leading address of the DF.

After area definition information is stored, control element 15 renews leading address information of assigned total areas in DF definition data with the presently stored leading address information (ST70). In addition, control element 15 subtracts the presently stored size information, and the byte number of area definition information from size information of an unassigned area in the DF definition information, and stores the difference as new size information of an unassigned area (ST72). Control element 15 then outputs response data indicating that area definition is completed (ST74), and is set in a command data waiting state.

with this processing, area definition information 27 and area definition information 30 are sequentially stored in defined DFs 21 and 22 from smaller addresses, and areas 25 and 28 defined by area definition information 27 and area definition information 30 are sequentially defined from larger addresses, as shown in FIGS. 6 and 7.

Figure 13A:
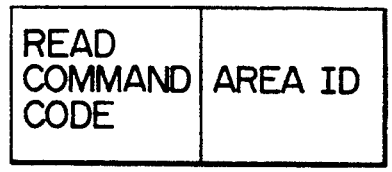
FIG. 13A shows a format of read command data to an area.
Figure 13B:
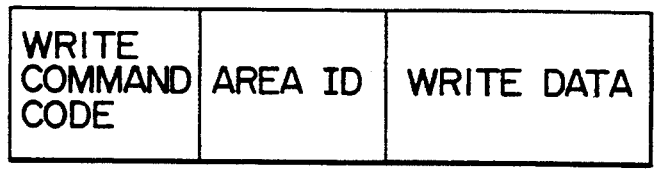
FIG. 13B shows a format of write command data to an area.

Area processing (intra-area data read/write processing) will be described below with reference to FIG. 16D. As a result of checking whether or not the input command data is area definition command data, if it is determined that the input data is not area definition command data (NO in ST48 in FIG. 16C), control element 15 checks if the input command data is read command data (area processing data) shown in FIG. 13A or write command (area processing data) shown in FIG. 13B (ST76). If it is determined that the input command data is not area processing command data shown in FIG. 13A or 13B (NO in ST76), control element 15 starts processing for determining another command data.

If it is determined that the input command data is area processing command data (YES in ST76), control element 15 looks up DF definition information stored in the RAM upon the DF selection to check if ADF 22 is selected (ST78).

As a result of checking, if ADF 22 is not selected (NO in ST78), control element 15 looks up the content of CDF 21 to find area definition information having the same area identification number (AID) as that in the input command data (ST82). If ADF 22 is selected (YES in ST78), control element 15 looks up the contents of CDF 21 and selected ADF 22 to similarly find area definition information (ST80). If no information is found (NO in ST84), control element 15 outputs response data indicating that an area is undefined, and is then set in a command data waiting state.

If the information is found (YES in ST84), control element 15 acquires information of the position of the target area on the memory based on the found area definition information, and executes read or write processing for the area (ST86). After the area processing is completed, control element 15 outputs the processing result as response data (ST88), and is then set in a command data waiting state.

Figure 14:
FIG. 14 shows a format of command data for requesting a remaining amount of a data file.

Processing for requesting remaining amounts of DFs and the data memory will be described below with reference to FIG. 16E. As a result of checking whether or not the input command data is area processing command data, if it is determined that the input data is not area processing command data (NO in ST76 in FIG. 16D), control element 15 checks if the input command data is command data for requesting a remaining amount of a DF shown in FIG. 14 (ST100). If it is determined that the input data is not command data for requesting a remaining amount of a DF (NO in ST100), control element 15 starts processing for determining another command data.

If it is determined that the input command data is command data for requesting a remaining amount of a DF (YES in ST100), control element 15 checks if ADF 22 has already been selected by previous DF selection command data (ST102). If it is determined that ADF 22 is not selected (NO in ST102), control element 15 outputs size information corresponding to CDF 21, and size information of an unassigned area (ST104). However, if it is determined that ADF 22 has already been selected (YES in 10 ST102), control element 15 outputs size information corresponding to selected ADF 22 and size information of an unassigned area (ST106). Then, control element 15 is set in a command data waiting state.

Figure 15:
FIG. 15 shows a format of command data for requesting a remaining amount of a card memory.

If it is determined that the input command data is not command data for requesting a remaining amount of a DF (NO in ST100), control element 15 checks if the input command data is command data for requesting a remaining amount of the card memory shown in FIG. 15 (ST108). If it is determined that the input data is not command data for requesting a remaining amount of the card memory (NO in ST108), control element 15 outputs response data indicating that command data is abnormal (ST110), and is then set in a command data waiting state. If it is determined that the input data is command data for requesting a remaining amount of the card memory (YES in ST108), control element 15 outputs size information of an assigned DF in size storage 31 (ST112), and is then set in a command data waiting state.

In this manner, since means for outputting size information of an unassigned DF to an external device in response to an externally input specific command is arranged, a useable memory size of an IC card delivered to a card issuer can be easily checked by the external device. When a data file is to be added, an unassigned size can be checked beforehand.

Furthermore, since means for outputting size 10 information of an unassigned area of a DF assigned to the data memory to an external device in response to an external request is arranged, an assigned size of a DF assigned by a card issuer, in particular, whether or not the area is unused can be easily checked by the external device, and the subsequent area assignment in the DF can be smoothly performed.

In the above embodiment (FIGS. 4 and 6), DF definition information is stored from smaller addresses of the data memory, and DFs defined by the DF definition information are sequentially defined from larger addresses. In contrast to this, DF definition information may be sequentially stored from larger addresses, and DFs may be sequentially defined from smaller addresses. The same applies to a storage method of area definition information in each DF, and area definition.

As described above, according to the present invention, a portable electronic device which allows easy external checking of a usable memory size in the device can be provided.

Furthermore, according to the present invention, a portable electronic device which allows easy external checking of an assigned size of an area (data file) assigned by an issuer, in particular, an unused area, can be provided.

Note that portable electronic devices to which the present invention can be applied include a handy terminal, an electronic notebook, a note type personal computer, and the like in addition to an IC card. In this case, each of these electronic devices has at least an arithmetic control function corresponding to a CPU or equivalent, and a memory, and the memory stores a common data file (CDF) and application data files (ADFs) or their equivalents.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A portable electronic device which is connectable to an external device, said portable electronic device comprising:

a memory, having a memory a real receiving means for receiving a command from said external device;

means for dividing said memory area into a plurality of data files in accordance with said command;

first memory means for storing data including a plurality of data file areas and file definition data storage areas, each said file definition data storage area having a leading address, an unused area address and an unused area size information corresponding to one of said data files, and each said data file areas having a data area, and area definition data storage areas for storing data area information, said data area information having a data area address corresponding to said data area;

second memory means for storing a first value representing unused first memory area size information and a second value representing leading first memory address information corresponding to said first memory means;

means for determining whether said command includes a whole unused area size output request and for determining whether said command includes an unused area size output request; and means for outputting one of said unused area size information and said first value in accordance with said determining means.

2. The portable electronic device according to claim 1, further comprising:

second receiving means for receiving, from said external device, data file definition data containing a data file definition command and data file size data;

second determining means for determining, based on said first value, whether said data file definition data can be stored in said first memory means;

calculation means for calculating, based on said data file size data a data file leading address, unused data file area address information and unused data file area size information when said second determining means determines that said data file definition data can be stored in said first memory means;

writing means for writing said data file leading address and a new data file size data into said file definition data storage area, said new data file size data being determined from said data file size data; and renewing means for replacing said first value with said unused data file area size information and for replacing said second value with said unused data file area address information.

3. The device according to claim 1, further comprising:

second receiving means for receiving, from said external device, area definition data containing an area definition command and area size data;

second determining means for determining, based on said unused area size information corresponding to a selected one of said data file areas, if said area definition data can be stored in said selected data file areas;

calculation means for calculating a leading data area address unused data area address and unused data area size information for said selected data file areas when said second determining means determines that said area definition data can be stored in said selected data file areas;

writing means for writing said leading data area address and a size area information into said selected data file areas, said size area information being determined from said area size data; and renewing means for replacing said unused area size information which corresponds to said selected data file areas with said unused data area size information and for replacing said unused area address which corresponds to said selected data file areas with said unused data area address.

4. The device according to claim 1, wherein said first memory means includes a common data file area and a plurality of second data file areas having a plurality of second data files.

5. The device according to claim 4, wherein said determining means includes second determining means for determining if said command includes a designation request, and means for designating one of said second data file areas in accordance with said designation request.

6. The device according to claim 5, wherein said outputting means comprises:
   second output means for outputting an unused second data files area size of said designated second data files; and
   third output means for outputting an unused common area size information corresponding to said common data file area when said designating means does not designate one of said second data file areas.

7. A method of issuing a portable electronic device having a memory and being connectable to an external device, said method comprising:
   first step of receiving a data file definition command and data file definition data including data file size data, from said external device;
   second step of storing in said memory said data file definition data in accordance with said data file definition command, and thereby dividing said memory into a plurality of data file areas;
   third step of calculating an unused area size of said memory by subtracting said data file size data from a storage capacity of said memory;
   fourth step of receiving from said external device a data area definition command and area definition data including area size data;
   fifth step of storing said area definition data in a selected one of said data file areas in accordance with said data area definition command;
   sixth step of calculating an unused data area of said selected data file areas based on said area size data and a second area size information corresponding to said selected data file areas;
   seventh step of receiving from said external device a size information output command and target data for designating a target area of said memory;
   eighth step of outputting, when the target data designates total memory, said unused area size; and
   ninth step of outputting, when the target data designates one of said plurality of data file areas, an unused data area information corresponding to said designated data file areas.

8. A portable electronic device which is connectable to an external device, said electronic device comprising:
   a memory, having a storage area of a predetermined capacity, for storing data including at least one data file;
   first memory means for storing information relating to said at least one data file, said information including size data corresponding to each said at least one data file;
   second memory means for storing a value representing a remaining capacity of said memory that can be assigned to further data files, said remaining capacity value being determined from said size data stored in said first memory means;
   means for calculating a difference between said remaining capacity value and a sum of a new size data corresponding to a new data file plus a byte number of said new data file and for updating said information based on said difference;
   third memory means for storing said size data;
   fourth memory means for storing a second value representing a remaining area of each said at least one data file in which further information can be stored, said remaining area being based on said size data for each said at least one data file;
   means for receiving a command from said external device;
   means for detecting if said command includes a remaining-capacity-output request; and
   means for outputting said remaining capacity value from said second memory means to said external device in accordance with said detecting means.

* * * * *